US012421694B2

(12) United States Patent
Nishimura

(10) Patent No.: US 12,421,694 B2
(45) Date of Patent: Sep. 23, 2025

(54) WORK MACHINE, METHOD FOR CONTROLLING WORK MACHINE, AND EXECUTION MANAGEMENT DEVICE

(71) Applicant: KOMATSU LTD., Tokyo (JP)

(72) Inventor: Minetaka Nishimura, Tokyo (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 18/236,548

(22) Filed: Aug. 22, 2023

(65) Prior Publication Data

US 2023/0392353 A1 Dec. 7, 2023

Related U.S. Application Data

(63) Continuation of application No. 17/424,302, filed as application No. PCT/JP2020/016598 on Apr. 15, 2020, now Pat. No. 11,781,292.

(30) Foreign Application Priority Data

Apr. 22, 2019 (JP) ................................ 2019-081307

(51) Int. Cl.
*E02F 9/26* (2006.01)
*E02F 3/32* (2006.01)
*G07C 3/12* (2006.01)

(52) U.S. Cl.
CPC .............. *E02F 9/261* (2013.01); *E02F 9/264* (2013.01); *G07C 3/12* (2013.01); *E02F 3/32* (2013.01)

(58) Field of Classification Search
CPC ... E02F 3/32; E02F 3/435; E02F 9/205; E02F 9/261; E02F 9/264; G07C 3/12
See application file for complete search history.

(56) References Cited

U.S. PATENT DOCUMENTS

| | | | |
|---|---|---|---|
| 9,371,626 | B2 | 6/2016 | Kami et al. |
| 9,481,976 | B2 | 11/2016 | Kami et al. |
| 9,556,594 | B2 | 1/2017 | Shimano et al. |
| 9,797,111 | B2 | 10/2017 | Kami et al. |
| 9,834,905 | B2 | 12/2017 | Matsuyama et al. |
| 10,428,472 | B1 | 10/2019 | Worsley |
| 10,458,099 | B2 | 10/2019 | Taylor et al. |
| 11,466,431 | B2 | 10/2022 | Sasaki et al. |
| 2010/0249957 | A1 | 9/2010 | Price |
| 2016/0010312 | A1 | 1/2016 | Kurihara et al. |
| 2016/0024757 | A1 | 1/2016 | Nomura et al. |
| 2016/0069040 | A1 | 3/2016 | Kami et al. |

(Continued)

FOREIGN PATENT DOCUMENTS

| | | |
|---|---|---|
| CN | 104246085 A | 12/2014 |
| CN | 105339560 A | 2/2016 |

(Continued)

*Primary Examiner* — Tyler J Lee
(74) *Attorney, Agent, or Firm* — Faegre Drinker Biddle & Reath LLP

(57) ABSTRACT

A work machine includes: a work implement including a bucket; a bucket position obtaining unit that obtains a position of the bucket; a distance calculating unit that calculates a distance between the position of the bucket obtained by the bucket position obtaining unit and a design topography of an execution object; and a recording unit that records existing topography data corresponding to the position of the bucket, based on the distance calculated by the distance calculating unit.

6 Claims, 15 Drawing Sheets

(56) References Cited

U.S. PATENT DOCUMENTS

| | | | |
|---|---|---|---|
| 2016/0069044 | A1 | 3/2016 | Takaura et al. |
| 2016/0145827 | A1 | 5/2016 | Kami et al. |
| 2016/0251824 | A1 | 9/2016 | Arimatsu et al. |
| 2016/0258135 | A1 | 9/2016 | Shimano et al. |
| 2016/0265186 | A1 | 9/2016 | Kami et al. |
| 2017/0089033 | A1* | 3/2017 | Matsuyama .......... E02F 9/2285 |
| 2017/0342679 | A1* | 11/2017 | Iwamura ................. E02F 9/262 |
| 2018/0202129 | A1 | 7/2018 | Fujii et al. |
| 2019/0078298 | A1 | 3/2019 | Ishibashi et al. |
| 2020/0232179 | A1 | 7/2020 | Sasaki et al. |

FOREIGN PATENT DOCUMENTS

| | | | |
|---|---|---|---|
| CN | 106460362 | A | 2/2017 |
| CN | 107002383 | A | 8/2017 |
| CN | 108286269 | A | 7/2018 |
| CN | 108884660 | A | 11/2018 |
| JP | 2016224038 | A | 12/2016 |
| JP | 2017-155563 | A | 9/2017 |
| JP | 2018-21425 | A | 2/2018 |
| JP | 2018-112051 | A | 7/2018 |
| JP | 2019-151973 | A | 9/2019 |
| KR | 10-1770774 | B1 | 8/2017 |
| WO | WO-2014/077221 | A1 | 5/2014 |
| WO | WO 2014/167740 | A1 | 10/2014 |
| WO | WO 2015/186201 | A1 | 12/2015 |

* cited by examiner

WORK MACHINE, METHOD FOR CONTROLLING WORK MACHINE, AND EXECUTION MANAGEMENT DEVICE

CROSS-REFERENCE TO RELATED APPLICATIONS

This application is a continuation application of U.S. patent application Ser. No. 17/424,302 filed Jul. 20, 2021, which is a 371 of International Patent Application No. PCT/JP2020/016598, filed Apr. 15, 2020, which claims the benefit of priority to Japanese Patent Application No. 2019-081307, filed Apr. 22, 2019, the entire contents of each of which are incorporated herein by reference.

TECHNICAL FIELD

The present disclosure relates to execution management for a work machine.

BACKGROUND ART

A technique of generating existing topography data based on information of a position through which a bucket passes has been conventionally developed in order to obtain an existing topography deformed as a result of execution of an execution object by a work machine (refer to PTL 1). Specifically, an execution management device described in PTL 1 specifies a trace of a cutting edge of a bucket based on position data of the cutting edge of the bucket, and updates a height of existing topography data to a height of a position through which the cutting edge of the bucket passes, when the height of the position through which the cutting edge of the bucket passes is lower than the height of the existing topography data.

CITATION LIST

Patent Literature

PTL 1: WO 2014/167740

SUMMARY OF INVENTION

Technical Problem

However, in the technique described in PTL 1, the topography data is updated based on a lowest point of the cutting edge of the bucket. Therefore, even when execution is subsequently performed at a position higher than the lowest point as a result of embankment work, the existing topography data is not updated. Therefore, a deviation from the actual existing topography may occur.

An object of the present disclosure is to provide a work machine, a method for controlling a work machine, an execution management device, and a method for controlling an execution management device, which can record existing topography data with high accuracy.

Solution to Problem

A work machine according to an aspect of the present disclosure includes: a work implement including a bucket; a bucket position obtaining unit that obtains a position of the bucket; a distance calculating unit that calculates a distance between the position of the bucket obtained by the bucket position obtaining unit and a design topography of an execution object; and a recording unit that records existing topography data corresponding to the position of the bucket, based on the distance calculated by the distance calculating unit.

A method for controlling a work machine according to an aspect of the present disclosure is a method for controlling a work machine including a work implement including a bucket, the method including: obtaining a position of the bucket; calculating a distance between the obtained position of the bucket and a design topography of an execution object; and recording existing topography data corresponding to the position of the bucket, based on the calculated distance.

An execution management device according to an aspect of the present disclosure includes: a bucket position obtaining unit that obtains a position of a bucket from a work machine including the bucket; a distance calculating unit that calculates a distance between the position of the bucket obtained by the bucket position obtaining unit and a design topography of an execution object; and a recording unit that records existing topography data corresponding to the position of the bucket, based on the distance calculated by the distance calculating unit.

A method for controlling an execution management device according to an aspect of the present disclosure includes: obtaining a position of a bucket from a work machine including the bucket; calculating a distance between the obtained position of the bucket and a design topography of an execution object; and recording existing topography data corresponding to the position of the bucket, based on the calculated distance.

Advantageous Effects of Invention

The work machine, the method for controlling the work machine, the execution management device, and the method for controlling the execution management device according to the present disclosure can record existing topography data with high accuracy.

DESCRIPTION OF EMBODIMENTS

Figure 1:
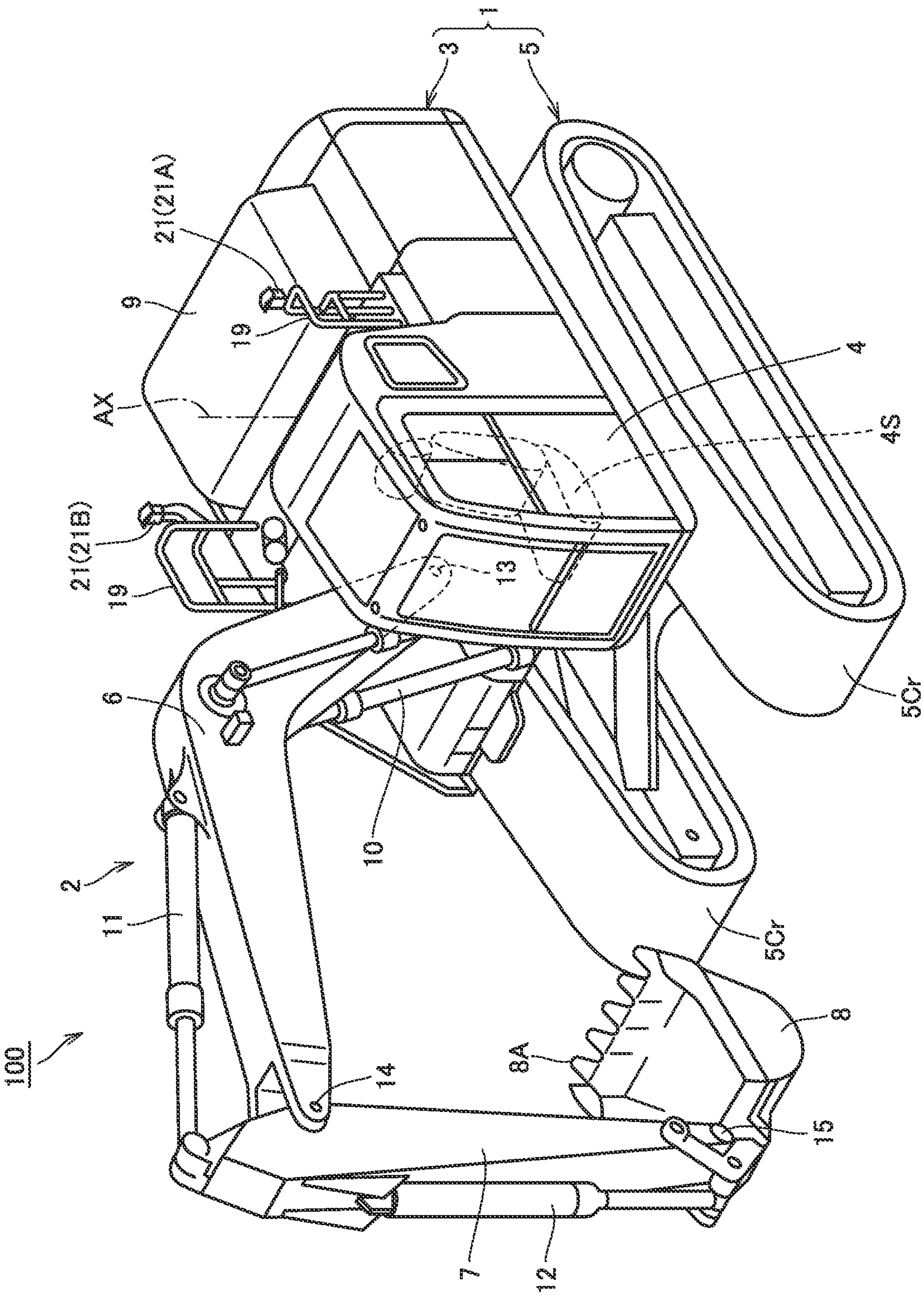
FIG. 1 is an external view of a work machine 100 based on a first embodiment.

Embodiments will be described hereinafter with reference to the drawings. In the following description, the same components are denoted by the same reference characters. Their names and functions are also the same. Therefore, detailed description about them will not be repeated.

First Embodiment

<Overall Configuration of Work Machine>

FIG. 1 is an external view of a work machine 100 based on a first embodiment.

As shown in FIG. 1, a hydraulic excavator CM including a work implement 2 operated by hydraulic pressure will be described by way of example as a work machine to which the concept of the present disclosure is applicable.

Hydraulic excavator CM includes a vehicular body 1 and work implement 2.

Vehicular body 1 includes a revolving unit 3, an operator's cab 4 and a traveling unit 5.

Revolving unit 3 is disposed on traveling unit 5. Traveling unit 5 supports revolving unit 3. Revolving unit 3 is revolvable about a revolving axis AX. Operator's cab 4 is provided with an operator's seat 4S on which an operator sits. The operator who sits in operator's cab 4 operates hydraulic excavator CM. Traveling unit 5 has a pair of crawler belts 5Cr. Rotation of crawler belts 5Cr causes hydraulic excavator CM to travel. Traveling unit 5 may be formed of wheels (tires).

In the first embodiment, the positional relation among components will be described with respect to the operator who sits on operator's seat 4S. The front-rear direction means the front-rear direction of the operator who sits on operator's seat 4S. The right-left direction means the right-left direction with respect to the operator who sits on operator's seat 4S. The right-left direction corresponds to the width direction of a vehicle (vehicle width direction). The direction in which the operator sitting on operator's seat 4S faces forward is defined as a frontward direction. The direction opposite to frontward direction is defined as a rearward direction. The right side and the left side of the operator sitting on operator's seat 4S and facing forward are defined as a rightward direction and a leftward direction, respectively.

Revolving unit 3 includes: an engine compartment 9 in which an engine is housed; and a counter weight provided in the rear portion of revolving unit 3. In revolving unit 3, a handrail 19 is provided frontward of engine compartment 9. An engine, a hydraulic pump and the like are disposed in engine compartment 9.

Work implement 2 is supported by revolving unit 3. Work implement 2 includes a boom 6, an arm 7, a bucket 8, a boom cylinder 10, an arm cylinder 11, and a bucket cylinder 12.

Boom 6 is connected to revolving unit 3 through a boom pin 13. Arm 7 is connected to boom 6 through an arm pin 14. Bucket 8 is connected to arm 7 through a bucket pin 15. Boom cylinder 10 drives boom 6. Arm cylinder 11 drives arm 7. Bucket cylinder 12 drives bucket 8. The base end (boom foot) of boom 6 and revolving unit 3 are connected. The leading end (boom top) of boom 6 and the base end (arm foot) of arm 7 are connected. The leading end (arm top) of arm 7 and the base end of bucket 8 are connected. Each of boom cylinder 10, arm cylinder 11 and bucket cylinder 12 is a hydraulic cylinder driven by hydraulic oil.

Boom 6 is pivotable with respect to revolving unit 3 about boom pin 13 as a pivot shaft. Arm 7 is pivotable with respect to boom 6 about arm pin 14 as a pivot shaft extending in parallel to boom pin 13. Bucket 8 is pivotable with respect to arm 7 about bucket pin 15 as a pivot shaft extending in parallel to boom pin 13 and arm pin 14.

Bucket 8 and work implement 2 correspond to examples of "bucket" and "work implement" in the present disclosure, respectively.

Figure 2:
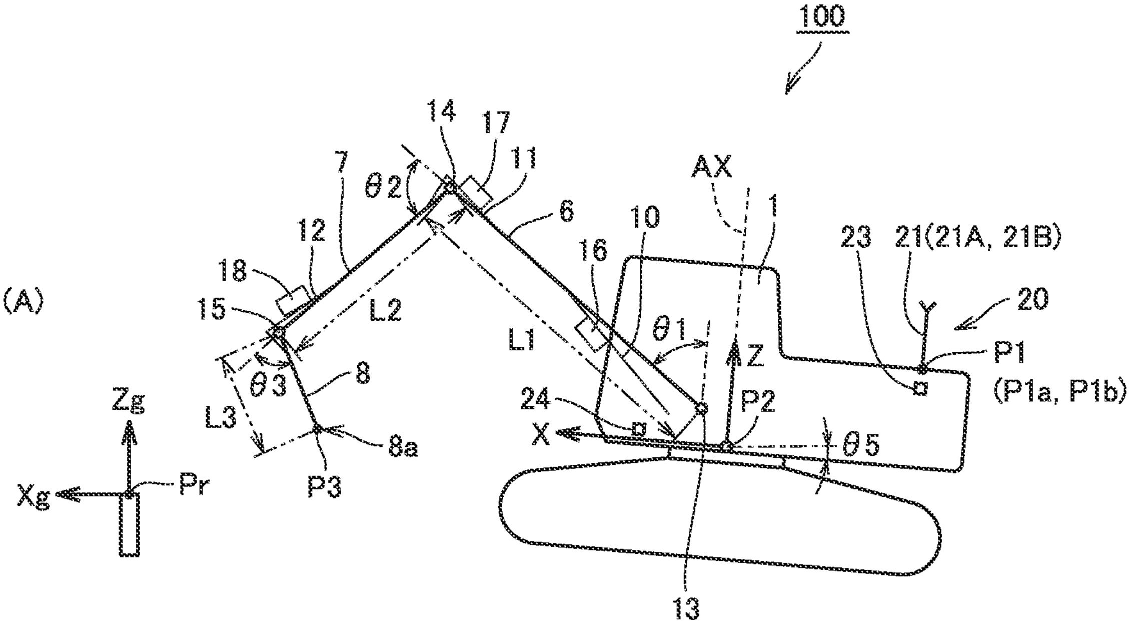
FIG. 2 schematically illustrates work machine 100 based on the first embodiment.
Figure 2:
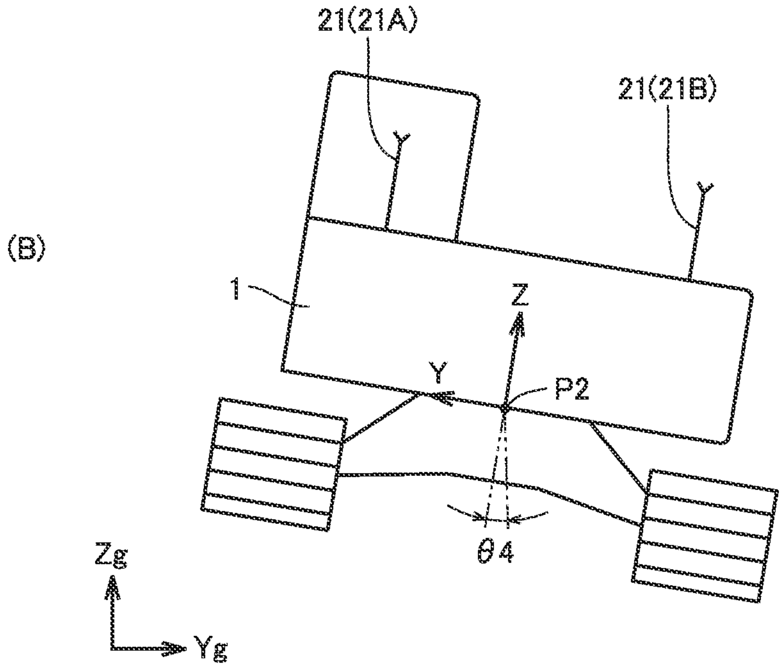

FIG. 2 schematically illustrates work machine 100 based on the first embodiment.

FIG. 2(A) shows a side view of work machine 100. FIG. 2(B) shows a rear view of work machine 100.

As shown in FIGS. 2(A) and 2(B), boom 6 has a length L1 corresponding to the distance between boom pin 13 and arm pin 14. Arm 7 has a length L2 corresponding to the distance between arm pin 14 and bucket pin 15. Bucket 8 has a length L3 corresponding to the distance between bucket pin 15 and a cutting edge 8A of bucket 8. Bucket 8 has a plurality of blades, and in the present example, the leading end of bucket 8 will be referred to as cutting edge 8A.

Bucket 8 may not have a blade. The leading end of bucket 8 may be formed of a steel plate having a straight shape.

Work machine 100 includes a boom cylinder stroke sensor 16, an arm cylinder stroke sensor 17 and a bucket cylinder stroke sensor 18. Boom cylinder stroke sensor 16 is disposed at boom cylinder 10. Arm cylinder stroke sensor 17 is disposed at arm cylinder 11. Bucket cylinder stroke sensor 18 is disposed at bucket cylinder 12. Boom cylinder stroke sensor 16, arm cylinder stroke sensor 17 and bucket cylinder stroke sensor 18 will also be collectively referred to as a cylinder stroke sensor.

A stroke length of boom cylinder 10 is obtained based on a detection result by boom cylinder stroke sensor 16. A stroke length of arm cylinder 11 is obtained based on a detection result by arm cylinder stroke sensor 17. A stroke length of bucket cylinder 12 is obtained based on a detection result by bucket cylinder stroke sensor 18.

In the present example, the stroke lengths of boom cylinder 10, arm cylinder 11 and bucket cylinder 12 will also be referred to as a boom cylinder length, an arm cylinder length and a bucket cylinder length, respectively. In addition, in the present example, the boom cylinder length, the arm cylinder length and the bucket cylinder length will also be collectively referred to as cylinder length data L. A method for detecting each stroke length using an angle sensor can also be used.

Work machine 100 includes a position detection device 20 that can detect a position of work machine 100.

Position detection device 20 includes an antenna 21, a global coordinate computing unit 23 and an inertial measurement unit (IMU) 24.

Antenna 21 is, for example, an antenna for global navigation satellite systems (GNSS). Antenna 21 is, for example, an antenna for real time kinematic-global navigation satellite systems (RTK-GNSS).

Antenna 21 is provided on revolving unit 3. In the present example, antenna 21 is provided on handrail 19 of revolving unit 3. Antenna 21 may be provided in the rearward direction of engine compartment 9. For example, antenna 21 may be provided on the counter weight of revolving unit 3. Antenna 21 outputs a signal corresponding to a received radio wave (GNSS radio wave) to global coordinate computing unit 23.

Global coordinate computing unit 23 detects a placement position P1 of antenna 21 in a global coordinate system. The global coordinate system is a three-dimensional coordinate system (Xg, Yg, Zg) based on a reference position Pr placed in a work area. In the present example, reference position Pr is a position of a tip of a reference stake set in a work area. A local coordinate system is a three-dimensional coordinate system indicated by (X, Y, Z) with respect to work machine 100. A reference position in the local coordinate system is data indicating a reference position P2 located at revolving axis (revolving center) AX of revolving unit 3.

In the present example, antenna 21 includes a first antenna 21A and a second antenna 21B provided on revolving unit 3 so as to be spaced apart from each other in the vehicle width direction.

Global coordinate computing unit 23 detects a placement position P1*a* of first antenna 21A and a placement position P1*b* of second antenna 21B. Global coordinate computing unit 23 obtains reference position data P indicated by a global coordinate. In the present example, reference position data P is data indicating reference position P2 located at revolving axis (revolving center) AX of revolving unit 3. Reference position data P may be data indicating placement position P1.

In the present example, global coordinate computing unit 23 generates revolving unit orientation data Q based on placement position P1*a* and placement position P1*b*. Revolving unit orientation data Q is determined based on an angle formed by a straight line, which is determined by placement position P1*a* and placement position P1*b*, with respect to a reference orientation (e.g., north) of the global coordinate. Revolving unit orientation data Q indicates an orientation in which revolving unit 3 (work implement 2) faces. Global coordinate computing unit 23 outputs reference position data P and revolving unit orientation data Q to a work implement controller 26 described below.

IMU 24 is provided in revolving unit 3. In the present example, IMU 24 is disposed in a lower part of operator's cab 4. In revolving unit 3, a highly-rigid frame is disposed in the lower part of operator's cab 4. IMU 24 is disposed on the frame. IMU 24 may be disposed laterally (right side or left side) to revolving axis AX (reference position P2) of revolving unit 3. IMU 24 detects an inclination angle θ4 of inclination of vehicular body 1 in the right-left direction, and an inclination angle θ5 of inclination of vehicular body 1 in the front-rear direction.

<Configuration of Control System>

Figure 3:
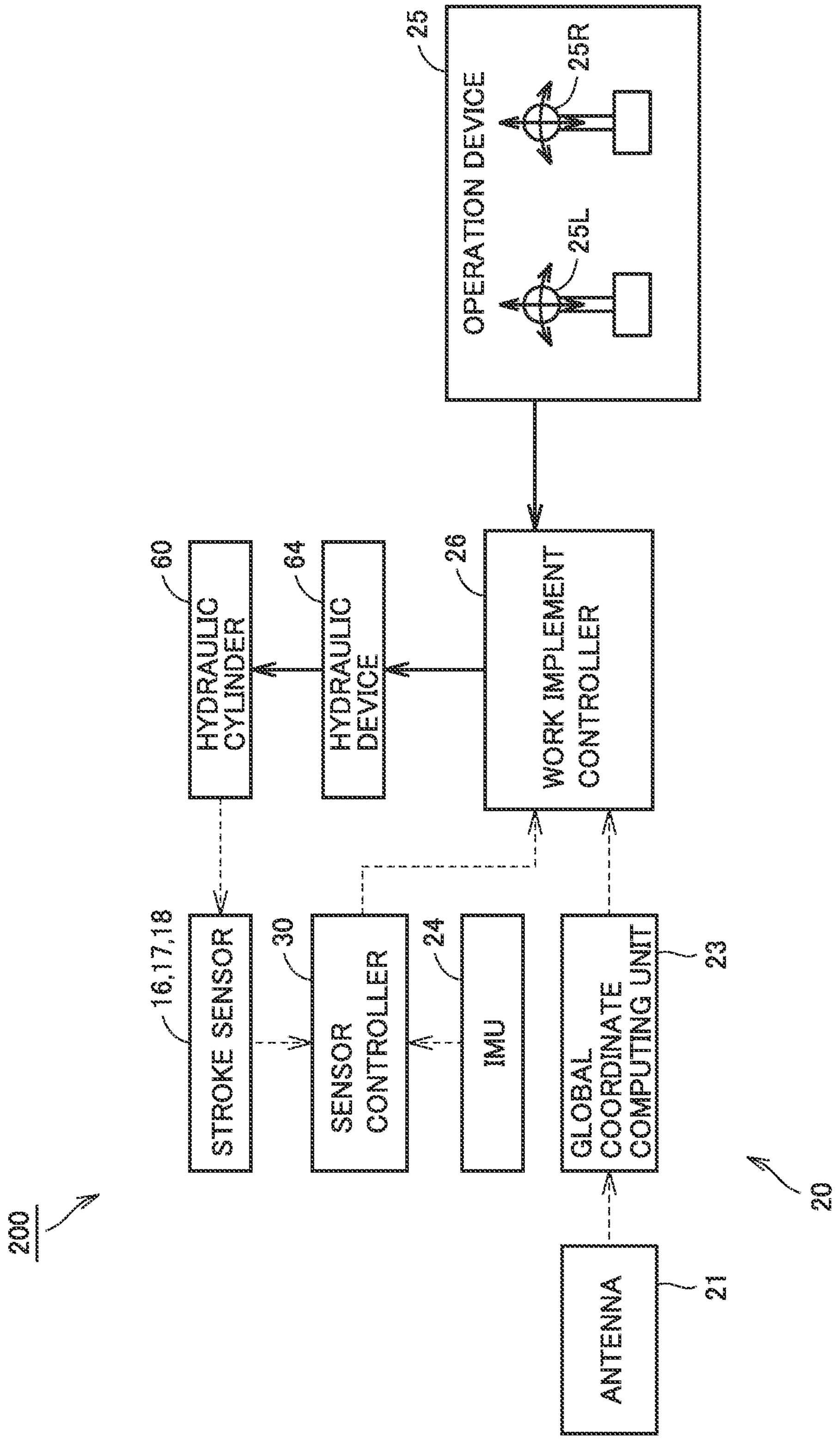
FIG. 3 is a schematic block diagram showing a configuration of a control system of work machine 100 based on the first embodiment.

FIG. 3 is a schematic block diagram showing a configuration of a control system of work machine 100 based on the first embodiment.

As shown in FIG. 3, work machine 100 includes boom cylinder stroke sensor 16, arm cylinder stroke sensor 17, bucket cylinder stroke sensor 18, antenna 21, global coordinate computing unit 23, IMU 24, an operation device 25, work implement controller 26, and a hydraulic device 64.

Operation device 25 is disposed in operator's cab 4. Operation device 25 is operated by an operator. Operation device 25 receives an operation by an operator for driving work implement 2. In the present example, operation device 25 is an operation device of a pilot hydraulic type.

Hydraulic device 64 includes a hydraulic oil tank, a hydraulic pump, a flow rate control valve, and an electromagnetic proportional control valve that are not shown. The hydraulic pump is driven by motive power of a not-shown engine, and supplies hydraulic oil to boom cylinder 10, arm cylinder 11 and bucket cylinder 12 through the flow rate control valve.

Operation device 25 includes a first operation lever 25R and a second operation lever 25L. First operation lever 25R is, for example, disposed on the right side of operator's seat 4S. Second operation lever 25L is, for example, disposed on the left side of operator's seat 4S. For first operation lever 25R and second operation lever the forward-backward and the rightward-leftward operations correspond to operations along two axes. Boom 6 and bucket 8 are operated by first operation lever 25R. Arm 7 and revolving unit 3 are operated by second operation lever 25L.

A sensor controller 30 calculates the boom cylinder length based on a detection result by boom cylinder stroke sensor 16. Boom cylinder stroke sensor 16 outputs a pulse involving the rotation operation to sensor controller 30. Sensor controller 30 calculates the boom cylinder length based on the pulse output from boom cylinder stroke sensor 16.

Similarly, sensor controller 30 calculates the arm cylinder length based on a detection result by arm cylinder stroke sensor 17. Sensor controller 30 calculates the bucket cylinder length based on a detection result by bucket cylinder stroke sensor 18.

Sensor controller 30 calculates an inclination angle θ1 of boom 6 with respect to the vertical direction of revolving unit 3 from the boom cylinder length calculated based on the detection result by boom cylinder stroke sensor 16. Sensor controller 30 calculates an inclination angle θ2 of arm 7 with respect to boom 6 from the arm cylinder length calculated based on the detection result by arm cylinder stroke sensor 17. Sensor controller 30 calculates an inclination angle θ3 of cutting edge 8A of bucket 8 with respective to arm 7 from the bucket cylinder length calculated based on the detection result by bucket cylinder stroke sensor 18.

Based on inclination angles θ1, θ2 and θ3 calculated as described above, inclination angle θ4 of inclination of vehicular body 1 in the right-left direction, inclination angle θ5 of inclination of vehicular body 1 in the front-rear direction, reference position data P, and revolving unit orientation data Q, it is possible to specify the positions of boom 6, arm 7 and bucket 8 of work machine 100, which makes it possible to generate bucket position data indicating the three-dimensional position of bucket 8.

Note that inclination angle θ1 of boom 6, inclination angle θ2 of arm 7, and inclination angle θ3 of bucket 8 may not be detected by the cylinder stroke sensor. Inclination angle θ1 of boom 6 may be detected by an angle detector such as a rotary encoder. The angle detector detects a bending angle of boom 6 with respect to revolving unit 3 to detect inclination angle θ1. Similarly, inclination angle θ2 of arm 7 may be detected by an angle detector attached to arm 7, and inclination angle θ3 of bucket 8 may be detected by an angle detector attached to bucket 8.

<Configuration of Work Implement Controller>

Figure 4:
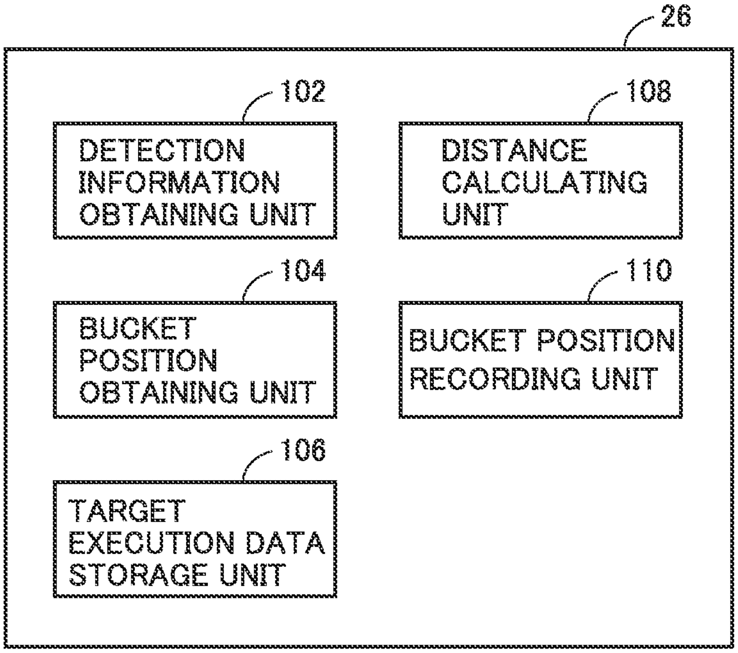
FIG. 4 is a block diagram showing a configuration of a work implement controller 26 based on the first embodiment.

FIG. 4 is a block diagram showing a configuration of work implement controller 26 based on the first embodiment.

As shown in FIG. 4, work implement controller 26 includes a detection information obtaining unit 102, a bucket position obtaining unit 104, a target execution data storage unit 106, a distance calculating unit 108, and a bucket position recording unit 110.

Detection information obtaining unit 102 obtains inclination angles θ1, θ2, θ3, θ4, and θ5 from sensor controller 30, and reference position data P and revolving unit orientation data Q from global coordinate computing unit 23.

Bucket position obtaining unit 104 can specify the positions of boom 6, arm 7 and bucket 8 of work machine 100 based on the information obtained by detection information obtaining unit 102, and calculates (obtains) bucket position data indicating the three-dimensional position of bucket 8.

Target execution data storage unit 106 stores target execution data indicating a design topography at an execution site. The target execution data is three-dimensional data indicated by the global coordinate system, and includes, for example, three-dimensional topography data formed of a plurality of triangular polygons indicating the design topography. Each of the triangular polygons that form the target execution data has a side that is in common with that of another triangular polygon adjacent to the triangular polygon. The target execution data indicates a continuous plane formed of a plurality of planes. The target execution data is read from an external storage medium and stored in target execution data storage unit 106. The target execution data may be obtained from not only the external storage medium but also an external server through a network and stored.

Distance calculating unit 108 calculates a distance between the position of bucket 8 and the design topography of the execution object. As one example, distance calculating unit 108 calculates a distance between the position of the cutting edge of bucket 8 and the design topography of the execution object. Distance calculating unit 108 calculates a distance in a perpendicular direction with respect to the design topography of the execution object from the position of the cutting edge of bucket 8. Distance calculating unit 108 may calculate not only the distance between the position of the cutting edge of bucket 8 and the design topography of the execution object, but also a distance between each of a plurality of contour points of bucket 8 and the design topography of the execution object. The contour point may be one of the plurality of contour points.

Figure 5:
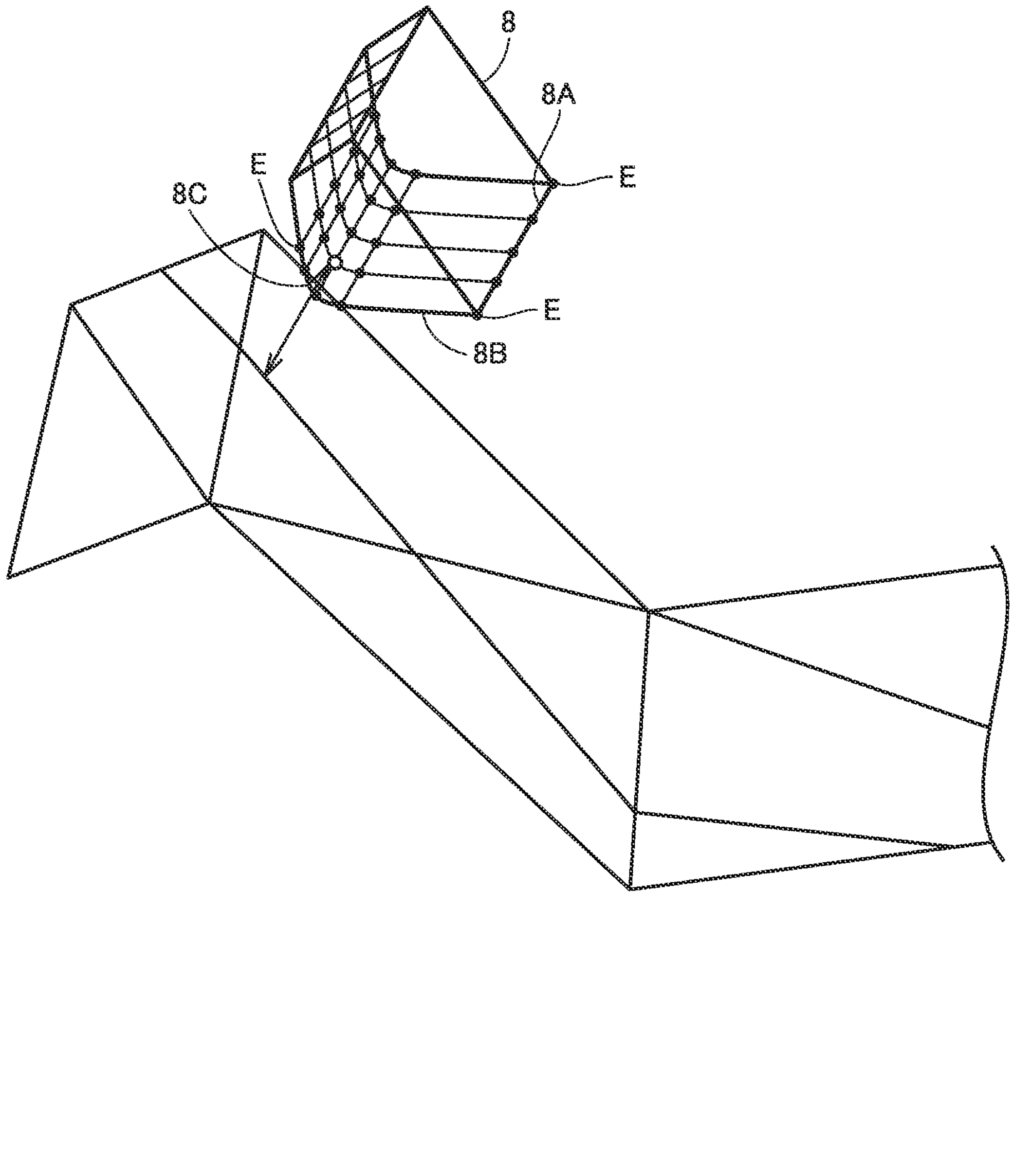
FIG. 5 shows a relation between a plurality of contour points of a bucket 8 and a design topography according to the first embodiment.

FIG. 5 shows a relation between the plurality of contour points of bucket 8 and the design topography according to the first embodiment.

As shown in FIG. 5, the plurality of contour points E of bucket 8 refer to intersection points of a plurality of transverse lines of bucket 8 and a plurality of transverse cross sections of bucket 8. The plurality of transverse lines of bucket 8 are formed of a cutting edge line for cutting edge 8A of bucket 8, and a plurality of lines that are parallel to the cutting edge line and located in regions such as a bottom surface 8B and a tail portion 8C of the bucket. The plurality of longitudinal cross sections of bucket 8 are formed of both side surfaces of bucket 8, and surfaces that are parallel to the side surfaces and serve as partitions between the side surfaces.

Referring again to FIG. 4, distance calculating unit 108 calculates a distance in the vertical direction with respect to the design topography for each of the plurality of contour points E. Distance calculating unit 108 calculates a distance between contour point E corresponding to the shortest distance, of the plurality of contour points E, and the design topography as the distance between the position of bucket 8 and the design topography of the execution object.

Bucket position recording unit 110 records existing topography data corresponding to the position of bucket 8 in a memory, based on the distance calculated by distance calculating unit 108. Bucket position recording unit 110 determines whether or not the distance calculated by distance calculating unit 108 is within a prescribed range. When bucket position recording unit 110 determines that the calculated distance is within the prescribed range, bucket position recording unit 110 records the bucket position data in the memory as the existing topography data. When bucket position recording unit 110 determines that the distance calculated by distance calculating unit 108 is not within the prescribed range, bucket position recording unit 110 does not record the bucket position data in the memory as the existing topography data. The bucket position data may be position data indicating the cutting edge of bucket 8, or may be one of the plurality of contour points E of bucket 8.

When bucket position recording unit 110 determines that the distance calculated by distance calculating unit 108 is within the prescribed range, bucket position recording unit 110 updates the latest bucket position data as the existing topography data. For example, in a case where bucket 8 repeatedly moves through a location indicated by the same X and Y coordinates of the three-dimensional data, bucket position recording unit 110 updates the latest bucket position data indicated by the Z coordinate as the existing topography data, when the distance calculated by distance calculating unit 108 is within the prescribed range.

Figure 6:
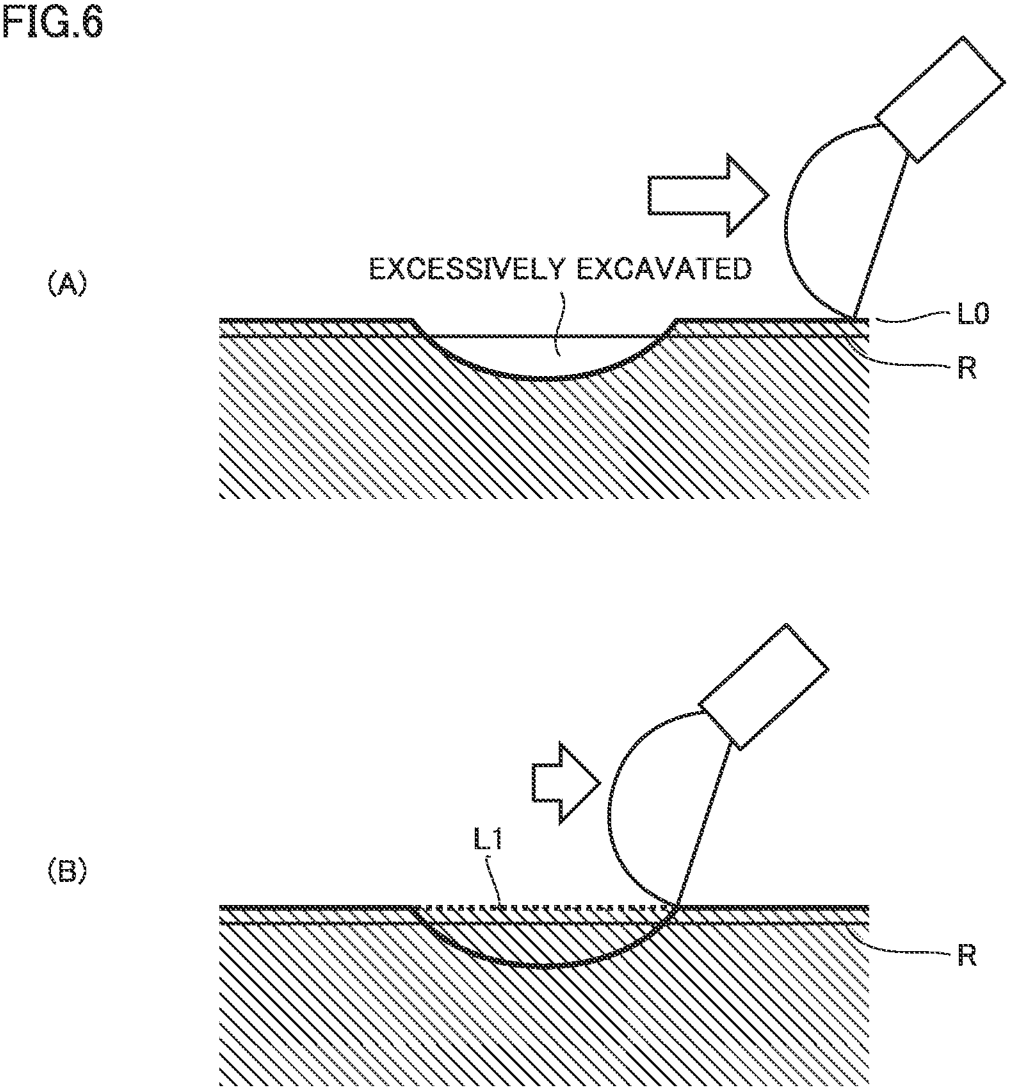
FIG. 6 illustrates conventional recording of existing topography data according to a comparative example.

Bucket position obtaining unit 104, distance calculating unit 108 and bucket position recording unit 110 correspond to examples of "bucket position obtaining unit", "distance calculating unit" and "recording unit" in the present disclosure, respectively. FIG. 6 illustrates conventional recording of existing topography data according to a comparative example.

FIG. 6(A) shows a case in which the work implement including the bucket has been operated at an execution site to come close to a design topography R, to thereby perform execution work of a work surface L0. FIG. 6(A) shows a case in which a part of work surface L0 has been excessively excavated beyond design topography R.

FIG. 6(B) shows a case in which the work implement including the bucket has been operated at an execution site to come close to design topography R, to thereby perform execution work of a work surface L1 together with embankment work.

In the conventional method, the existing topography data is updated based on the lowest point of the cutting edge of bucket 8. Therefore, when the execution work is performed together with the embankment work after excessive excavation beyond design topography R, the works are performed at a position higher than the lowest point. Thus, the existing topography data is not updated and a state of work surface L0 is maintained as the existing topography data. Accordingly, a deviation from the actual existing topography may occur.

Figure 7:
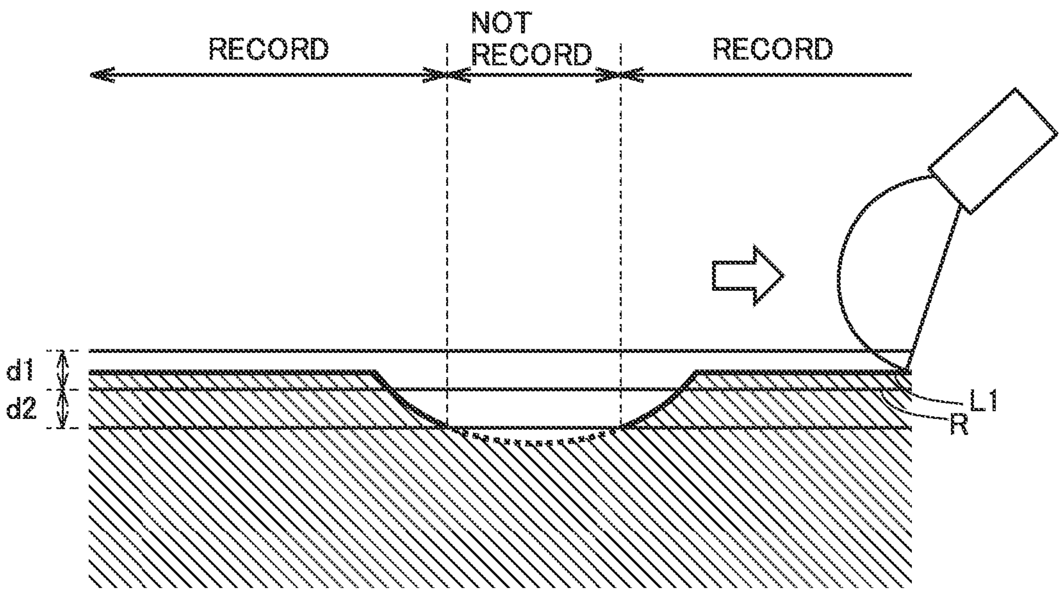
FIG. 7 illustrates recording (No. 1) of existing topography data by work implement controller 26 according to the first embodiment.

FIG. 7 illustrates recording (No. 1) of the existing topography data by work implement controller 26 according to the first embodiment.

FIG. 7 shows a case in which the work implement including the bucket has been operated at an execution site to come close to design topography R, to thereby perform execution work of work surface L1. FIG. 7 shows a case in which a part of work surface L1 has been excessively excavated beyond design topography R.

In the first embodiment, a region having a width of an upper side region d1 with respect to design topography R and a width of a lower side region d2 with respect to design topography R is preset as the prescribed range. The width of upper side region d1 and the width of lower side region d2 may have the same value, or may have different values.

Distance calculating unit 108 calculates the distance between design topography R and bucket 8.

When bucket position recording unit 110 determines that the distance calculated by distance calculating unit 108 is within the prescribed range, bucket position recording unit 110 records the bucket position data in the memory as the existing topography data.

Bucket position recording unit 110 records the bucket position data corresponding to work surface L1 when the distance calculated by distance calculating unit 108 is within the prescribed range in the memory as the existing topography data. When the distance calculated by distance calculating unit 108 is outside the prescribed range, bucket position recording unit 110 does not record the bucket position data in the memory as the existing topography data.

Figure 8:
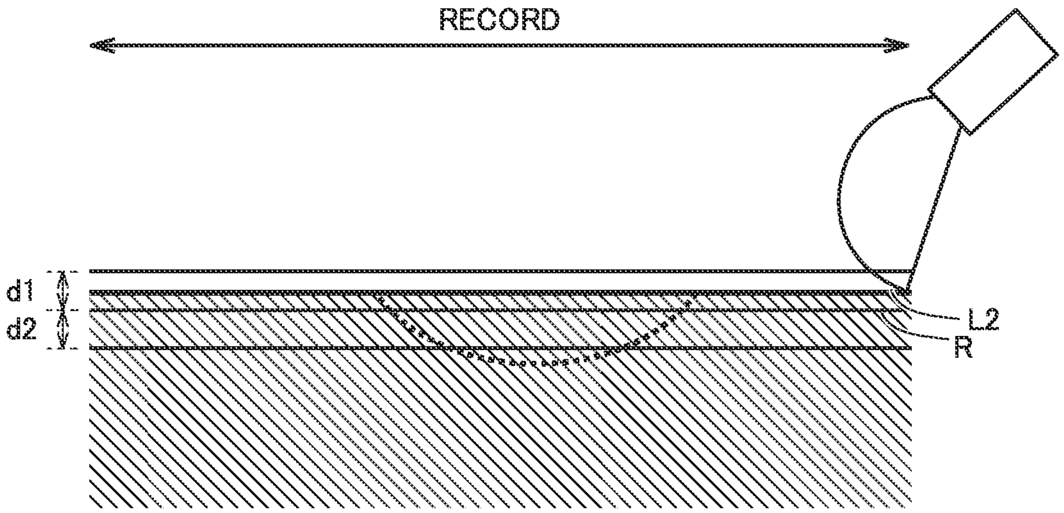
FIG. 8 illustrates recording (No. 2) of existing topography data by work implement controller 26 according to the first embodiment.

FIG. 8 illustrates recording (No. 2) of the existing topography data by work implement controller 26 according to the first embodiment.

FIG. 8 shows a case in which the work implement including the bucket has been operated at an execution site to come close to design topography R, to thereby perform execution work of a work surface L2 together with embankment work.

When bucket position recording unit 110 determines that the distance calculated by distance calculating unit 108 is within the prescribed range, bucket position recording unit 110 records the bucket position data in the memory as the existing topography data.

Bucket position recording unit 110 records the bucket position data corresponding to work surface L2 when the distance calculated by distance calculating unit 108 is within the prescribed range in the memory as the existing topography data. Therefore, the bucket position data corresponding to latest work surface L2 is recorded as the existing topography data. Thus, a deviation from the actual existing topography does not occur and the latest existing topography data can be recorded with high accuracy.

Figure 9:
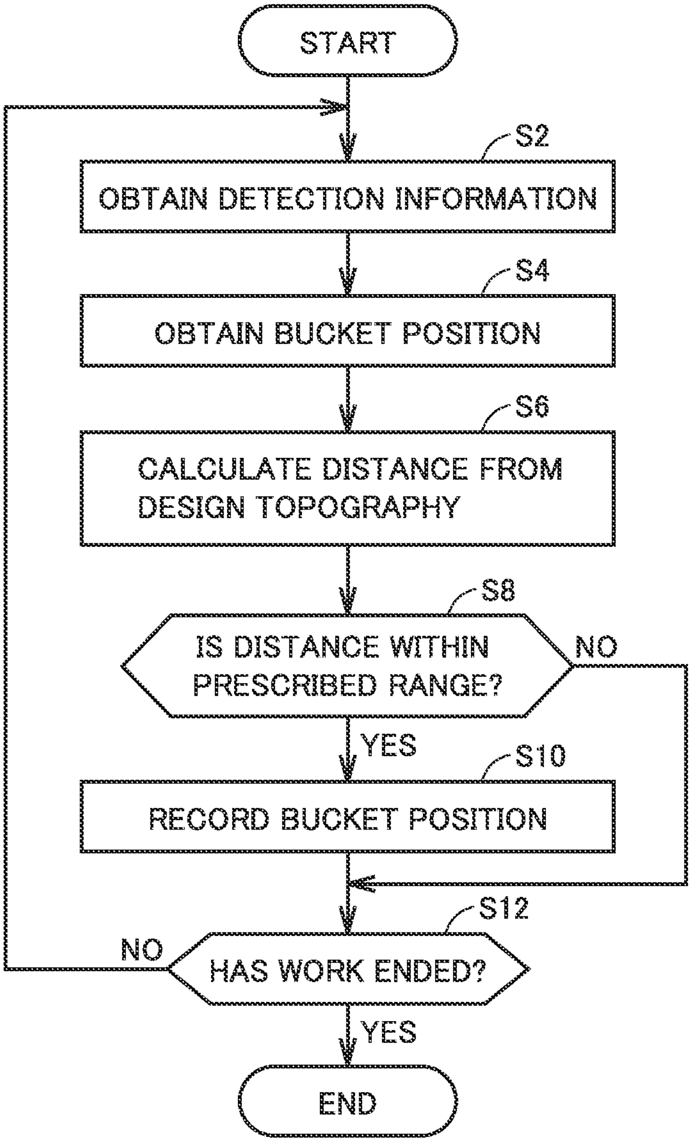
FIG. 9 is a flowchart illustrating recording of existing topography data by work implement controller 26 according to the first embodiment.

FIG. 9 is a flowchart illustrating recording of the existing topography data by work implement controller 26 according to the first embodiment.

Referring to FIG. 9, work implement controller 26 obtains detection information (step S2).

Detection information obtaining unit 102 obtains inclination angles θ1, θ2, θ3, θ4, and θ5 from sensor controller 30, and reference position data P and revolving unit orientation data Q from global coordinate computing unit 23.

Next, work implement controller 26 obtains a bucket position (step S4). Bucket position obtaining unit 104 can specify the positions of boom 6, arm 7 and bucket 8 of work machine 100 based on the information obtained by detection information obtaining unit 102, and calculates (obtains) bucket position data indicating the three-dimensional position of bucket 8.

Next, work implement controller 26 calculates a distance from a design topography (step S6).

Distance calculating unit 108 calculates a distance between the position of bucket 8 calculated by bucket position obtaining unit 104 and the design topography of the execution object. The distance between the position of bucket 8 and the design topography may be a distance between the position of the cutting edge of bucket 8 and the design topography. Alternatively, as described with reference to FIG. 5, a distance in the vertical direction with respect to the design topography may be calculated for each of the plurality of contour points E of bucket 8 and a distance between contour point E corresponding to the shortest distance and the design topography may be calculated as the distance between the position of the bucket and the design topography of the execution object.

Next, work implement controller 26 determines whether or not the distance is within a prescribed range (step S8). Bucket position recording unit 110 determines whether or not the distance calculated by distance calculating unit 108 is within the prescribed range.

Next, when work implement controller 26 determines that the distance is within the prescribed range (YES in step S8), work implement controller 26 records existing topography data corresponding to the position of bucket 8 in the memory. When bucket position recording unit 110 determines that the calculated distance is within the prescribed range, bucket position recording unit 110 records the bucket position data calculated by bucket position obtaining unit 104 in the memory as the existing topography data.

Next, work implement controller 26 determines whether or not the work has ended (step S12). When work implement controller 26 determines that an operation by an operator is not received from operation device 25 for a prescribed time period, work implement controller 26 determines that the work has ended. Alternatively, when a command to stop the engine of work machine 100 is received, work implement controller 26 may determine that the work has ended.

When work implement controller 26 determines in step S12 that the work has not ended (NO in step S12), the process is returned to step S2 and the above-described steps are repeated.

On the other hand, when work implement controller 26 determines in step S12 that the work has ended (YES in step S12), the process is ended (end).

When work implement controller 26 determines in step S8 that the distance is not within the prescribed range (NO in step S8), step S10 is skipped and the process proceeds to step S12. When bucket position recording unit 110 determines that the calculated distance is not within the prescribed range, bucket position recording unit 110 does not record the bucket position data calculated by bucket position obtaining unit 104 in the memory as the existing topography data.

With the above-described process, when the distance between design topography R and the position of bucket 8 is within the prescribed range in the execution work at design topography R and its surroundings, work implement controller 26 records the bucket position data as the existing topography data. Therefore, the existing topography data can be recorded with high accuracy in the execution work at design topography R and its surroundings.

Second Embodiment

In the first embodiment, description has been given of the case in which the bucket position data is recorded as the existing topography data when the distance between design topography R and the position of the bucket is within the prescribed range.

In a second embodiment, a method for recording existing topography data so as to directly reflect an intention of a worker will be described.

Figure 10:
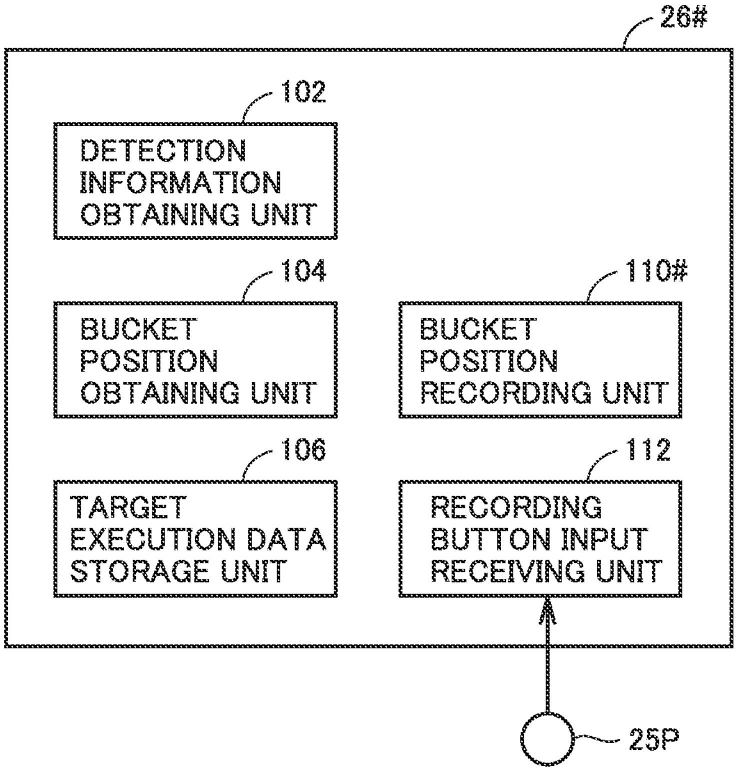
FIG. 10 is a block diagram showing a configuration of a work implement controller 26# based on a second embodiment.

FIG. 10 is a block diagram showing a configuration of a work implement controller 26# based on the second embodiment.

As shown in FIG. 10, work implement controller 26# includes detection information obtaining unit 102, bucket position obtaining unit 104, target execution data storage unit 106, a bucket position recording unit 110#, and a recording button input receiving unit 112.

Operation device 25 further includes a recording button 25P for recording the existing topography data.

Work implement controller 26# is different from work implement controller 26# in that distance calculating unit 108 is removed, bucket position recording unit 110 is replaced with bucket position recording unit 110#, and recording button input receiving unit 112 is further provided. Since the remaining configuration is the same, detailed description thereof will not be repeated.

Recording button input receiving unit 112 receives an input of recording button 25P.

Bucket position recording unit 110# records bucket position data as the existing topography data in accordance with the input of recording button 25P received by recording button input receiving unit 112. Therefore, the bucket position data at a position desired by a user can be recorded as the existing topography data in accordance with the input of recording button 25P by the user.

Recording button 25P corresponds to an example of "operation member" in the present disclosure.

Figure 11:
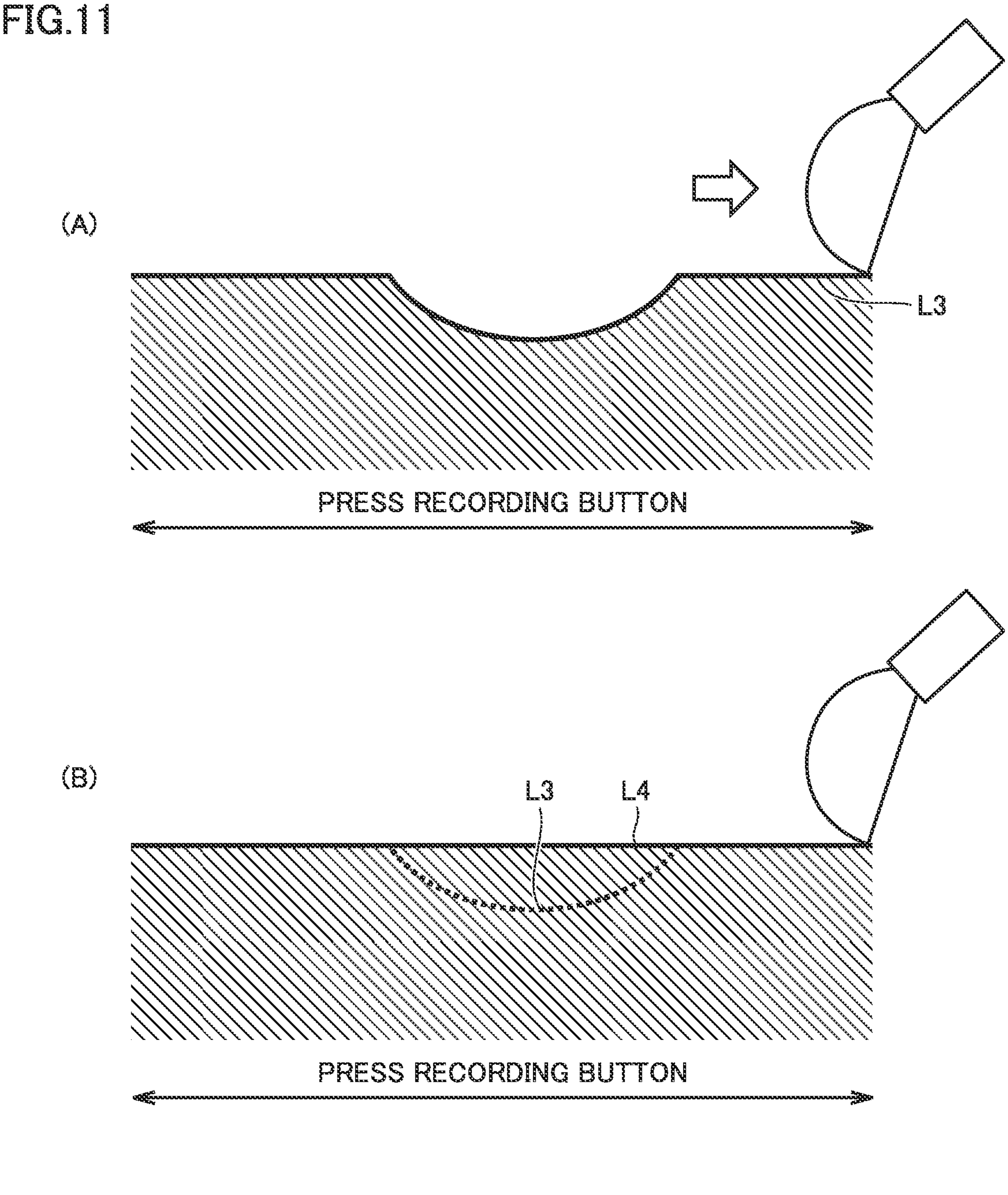
FIG. 11 illustrates recording of existing topography data by work implement controller 26# according to the second embodiment.

FIG. 11 illustrates recording of the existing topography data by work implement controller 26# according to the second embodiment.

FIG. 11(A) shows a case in which the work implement including the bucket has been operated at an execution site, to thereby perform execution work of a work surface L3. FIG. 11(A) shows a case in which a part of work surface L3 has been excessively excavated.

In the second embodiment, bucket position recording unit 110# records the bucket position data as design topography data in accordance with the input of recording button 25P by a worker.

In the present example, bucket position recording unit 110# records the bucket position data corresponding to work surface L3 as the existing topography data.

FIG. 11(B) shows a case in which the work implement including the bucket has been operated at an execution site, to thereby perform execution work of a work surface L4 together with embankment work.

In the second embodiment, bucket position recording unit 110# records the bucket position data as the design topography data in accordance with the input of recording button 25P by a worker.

Therefore, the bucket position data corresponding to latest work surface L4 is recorded as the existing topography data in accordance with an intention of the worker. Thus, a deviation from the actual existing topography does not occur and the latest existing topography data can be recorded with high accuracy.

Figure 12:
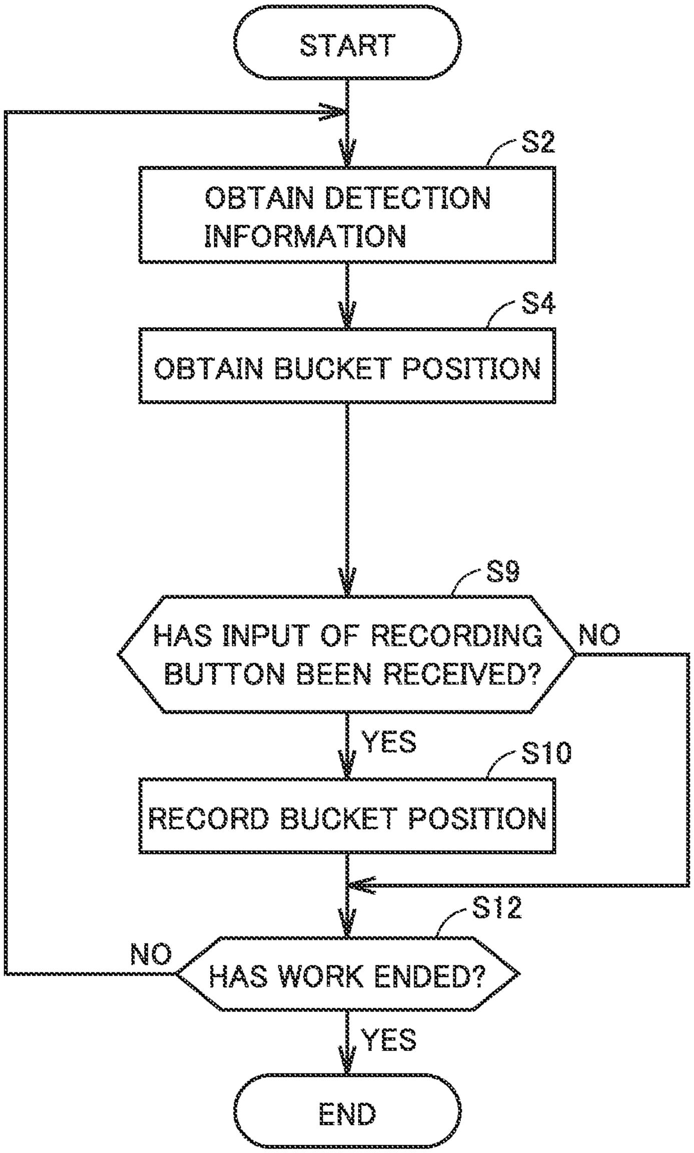
FIG. 12 is a flowchart illustrating recording of existing topography data by work implement controller 26# according to the second embodiment.

FIG. 12 is a flowchart illustrating recording of the existing topography data by work implement controller 26# according to the second embodiment.

Referring to FIG. 12, work implement controller 26# obtains detection information (step S2).

Detection information obtaining unit 102 obtains inclination angles θ1, θ2, θ3, θ4, and θ5 from sensor controller 30, and reference position data P and revolving unit orientation data Q from global coordinate computing unit 23.

Next, work implement controller 26# obtains a bucket position (step S4).

Bucket position obtaining unit 104 can specify the positions of boom 6, arm 7 and bucket 8 of work machine 100 based on the information obtained by detection information obtaining unit 102, and calculates (obtains) bucket position data indicating the three-dimensional position of bucket 8.

Next, work implement controller 26# determines whether or not an input of recording button 25P has been received (step S9). Recording button input receiving unit 112 determines whether or not the input of recording button 25P has been received.

Next, when work implement controller 26# determines that the input of recording button 25P has been received (YES in step S9), work implement controller 26# records existing topography data corresponding to the position of bucket 8 in the memory. When the input of recording button 25P has been received, recording button input receiving unit 112 notifies bucket position recording unit 110 about the reception of the input of recording button 25P. In accordance with the notification from recording button input receiving unit 112, bucket position recording unit 110 records the bucket position data calculated by bucket position obtaining unit 104 in the memory as the existing topography data.

Next, work implement controller 26# determines whether or not the work has ended (step S12). When work implement controller 26# determines that an operation by an operator is not received from operation device 25 for a prescribed time period, work implement controller 26# determines that the work has ended. Alternatively, when a command to stop the engine of work machine 100 is received, work implement controller 26# may determine that the work has ended.

When work implement controller 26# determines in step S12 that the work has not ended (NO in step S12), the process is returned to step S2 and the above-described steps are repeated.

On the other hand, when work implement controller 26# determines in step S12 that the work has ended (YES in step S12), the process is ended (end).

When work implement controller 26# determines in step S9 that the input of recording button 25P has not been received (NO in step S9), step S10 is skipped and the process proceeds to step S12. When bucket position recording unit 110 does not receive the notification from recording button input receiving unit 112, bucket position recording unit 110 does not record the bucket position data calculated by bucket position obtaining unit 104 in the memory as the existing topography data.

With the above-described process, work implement controller 26# records the bucket position data as the existing topography data in the execution work in accordance with the input of recording button 25P. Therefore, the latest existing topography data can be recorded with high accuracy in accordance with an intention of a user.

In the present example, description has been given of the configuration in which recording button 25P is provided in operation device 25 and recording button input receiving unit 112 receives the input of the recording button. However, the present disclosure is not particularly limited to the recording button. A recording switch may be used, or any other means may be used as long as it is an operation member that can receive an operation for recording.

Third Embodiment

In a third embodiment, a combination of the method according to the first embodiment and the method according to the second embodiment will be described.

Figure 13:
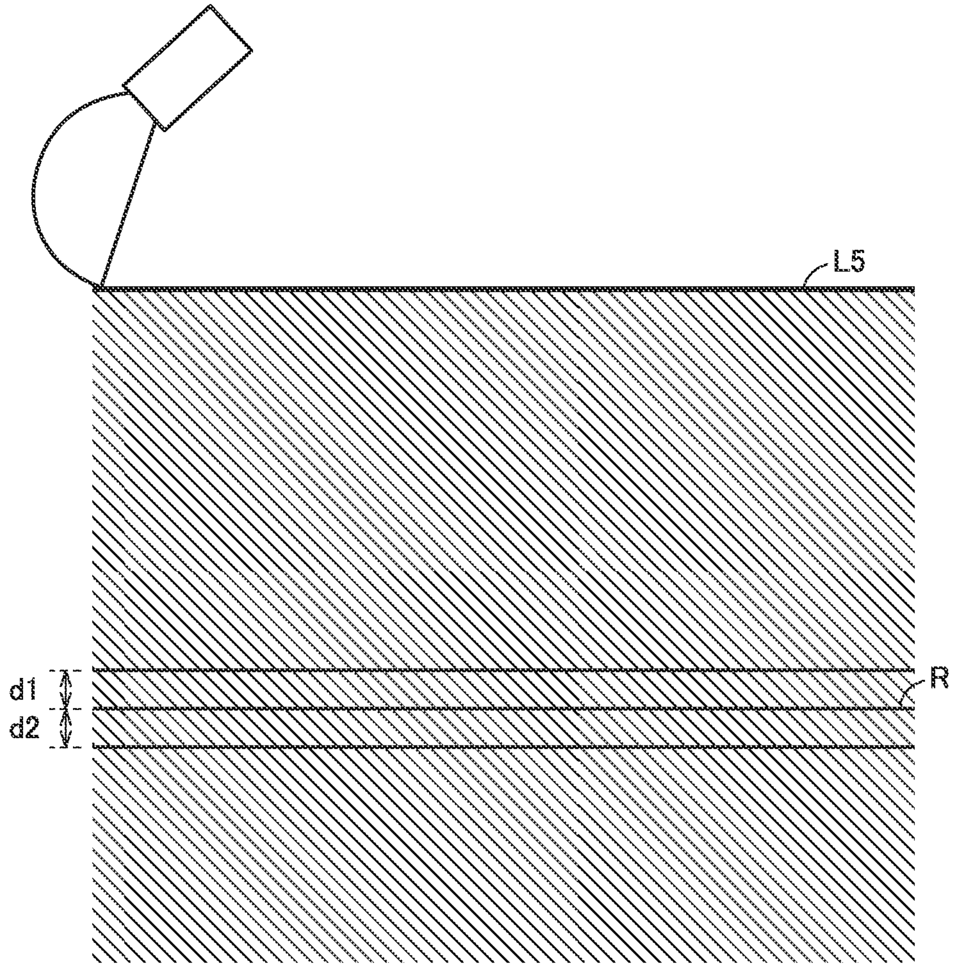
FIG. 13 illustrates recording of existing topography data by work implement controller 26# according to a third embodiment.

FIG. 13 illustrates recording of existing topography data by work implement controller 26# according to the third embodiment.

FIG. 13 shows a case in which the work implement including the bucket is operated at an execution site to come close to design topography R, to thereby perform execution work. Specifically, FIG. 13 shows a case in which execution work of a work surface L5 has been performed at a position distant from design topography R.

In the method according to the first embodiment, when the distance between design topography R and the position of bucket 8 is within the prescribed range, the bucket position data is recorded as the existing topography data. Therefore, when the work implement including the bucket is operated to thereby perform the execution work at the position distant from design topography R as in this case, the bucket position data is not recorded as the existing topography data.

However, if the work progress during excavation work can be recorded as the existing topography data, convenience for the execution work is enhanced. In the third embodiment, when the distance between design topography R and the position of the bucket is within the prescribed range, the bucket position data is recorded as the existing topography data. Even when the distance between design topography R and the position of the bucket is not within the prescribed range, the bucket position data is recorded as the existing topography data when the input of recording button 25P is received.

With the above-described process, work implement controller 26# can record the work progress during the excavation work as the existing topography data, and thus, the existing topography data corresponding to the actual existing topography can be recorded.

Figure 14:
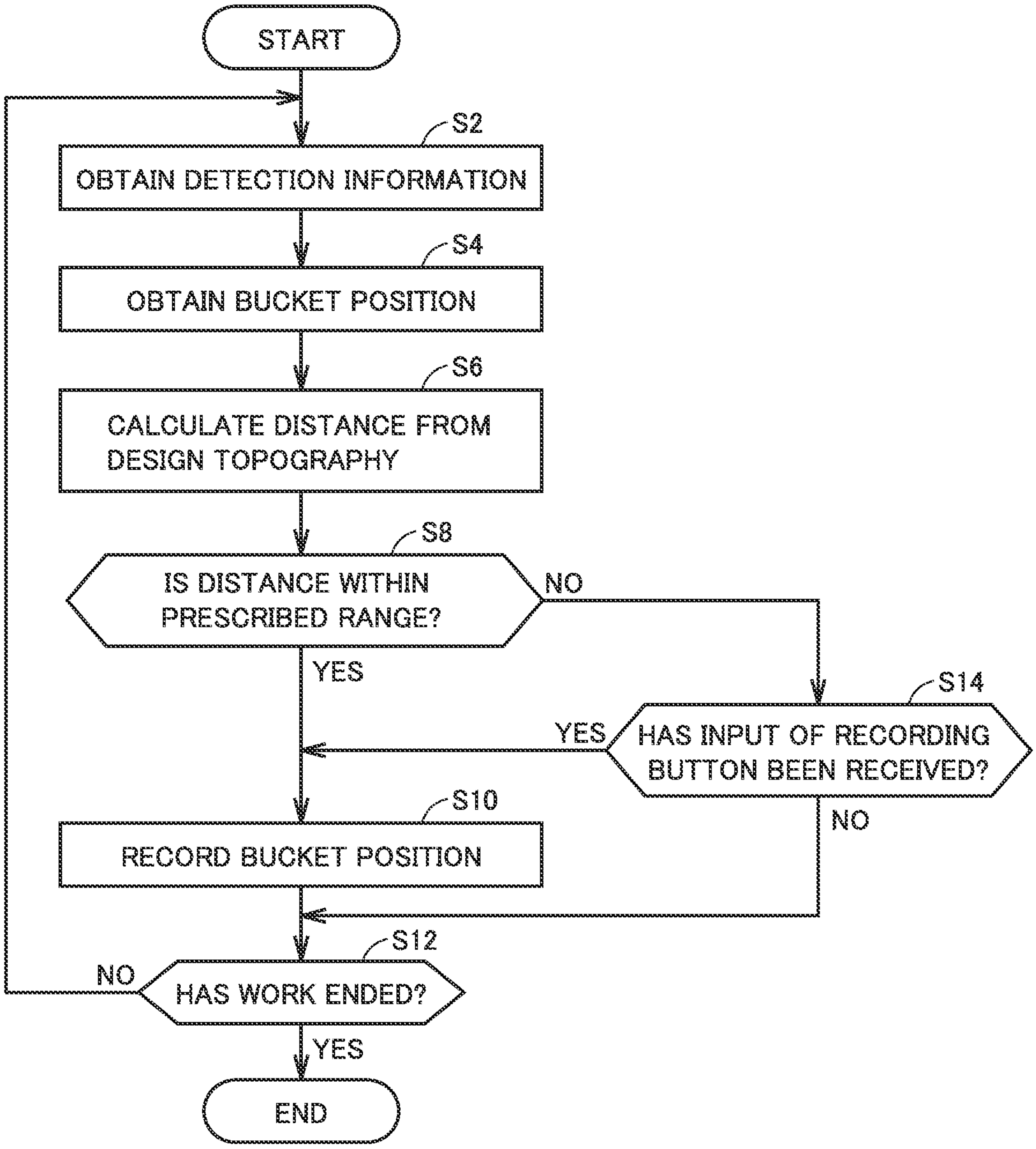
FIG. 14 is a flowchart illustrating recording of existing topography data by work implement controller 26# according to the third embodiment.

FIG. 14 is a flowchart illustrating recording of the existing topography data by work implement controller 26# according to the third embodiment.

Referring to FIG. 14, the flowchart in FIG. 14 is different from the flowchart in FIG. 9 in that step S14 is added. Since the remaining flow is the same as that described with reference to FIG. 9, detailed description thereof will not be repeated.

When work implement controller 26# determines that the distance is not within the prescribed range (NO in step S8), work implement controller 26# determines in step S14 whether or not an input of recording button 25P has been received (step S14). Recording button input receiving unit 112 receives the input of recording button 25P and outputs a notification about the reception of the input of recording button 25P to bucket position recording unit 110.

When work implement controller 26# determines in step S14 that the input of recording button 25P has been received, the process proceeds to step S10 and work implement controller 26# records the existing topography data corresponding to the position of the bucket in the memory. When the calculated distance is within the prescribed range, bucket position recording unit 110 records the bucket position data calculated by bucket position obtaining unit 104 in the memory as the existing topography data.

On the other hand, when work implement controller 26# determines in step S14 that the input of recording button 25P has not been received, step S10 is skipped and the process proceeds to step S12. When bucket position recording unit 110 determines that the input of recording button 25P has not been received, bucket position recording unit 110 does not record the bucket position data calculated by bucket position obtaining unit 104 in the memory as the existing topography data.

With the above-described process, the bucket position data when the distance between design topography R and the position of the bucket is within the prescribed range at design topography R and its surroundings is recorded as the existing topography data. Even when the distance between design topography R and the position of the bucket is not within the prescribed range, the bucket position data is recorded as the existing topography data in accordance with the input of recording button 25P. Therefore, the latest existing topography data corresponding to the existing topography can be recorded with high accuracy in accordance with an intention of a user.

Fourth Embodiment

In the above-described embodiments, description has been given of the case in which the existing topography data is generated in the work machine. However, the present disclosure is not particularly limited to the work machine, and the existing topography data may be generated in an external device.

Figure 15:
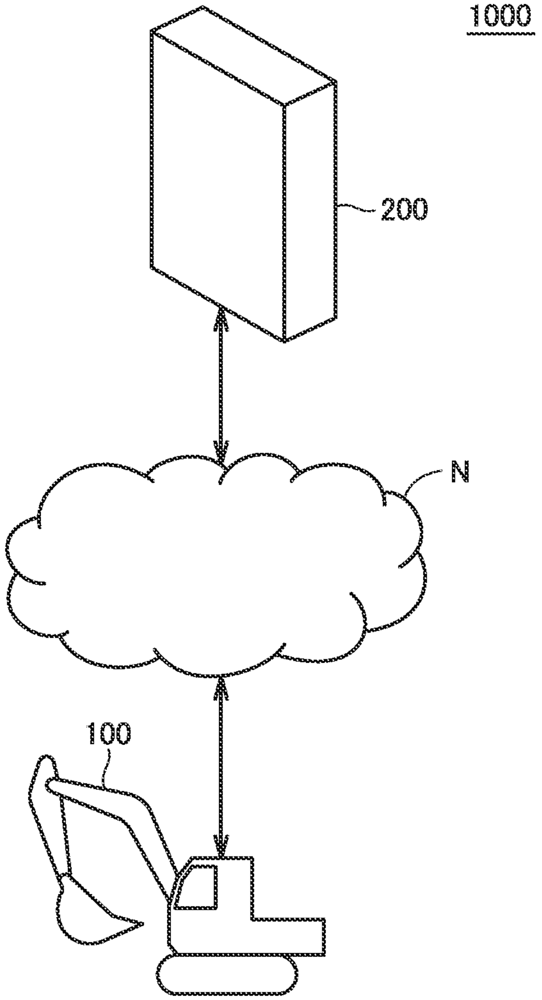
FIG. 15 illustrates a configuration of an execution management system 1000 according to a fourth embodiment.

FIG. 15 illustrates a configuration of an execution management system 1000 according to a fourth embodiment.

Referring to FIG. 15, execution management system 1000 includes work machine 100 and an execution management device 200.

Work machine 100 and execution management device 200 are connected through a network N.

Work machine 100 transmits the information from sensor controller 30 and global coordinate computing unit 23 to execution management device 200 through network N.

Execution management device 200 includes the functional blocks of work implement controller 26# described with reference to FIG. 4, and execution management device 200 calculates (obtains) bucket position data and records the bucket position data in the memory as existing topography data.

In the configuration according to the fourth embodiment, execution management device 200, which is an external device, calculates the bucket position data and records the bucket position data in the memory as the existing topography data, which makes it possible to reduce a processing load of work machine 100.

In the present example, description is given of the case in which execution management device 200 calculates the bucket position data and records the bucket position data in the memory as the existing topography data. However, the present disclosure is not particularly limited to the above-described case, and a part of the process may be performed on the work machine 100 side and the remaining process may be performed on the execution management device 200 side.

In the above-described embodiments, the hydraulic excavator has been described as an example of the work machine. However, the present disclosure is not limited to the hydraulic excavator, and is also applicable to other types of work machines such as a crawler dozer and a wheel loader.

Although the embodiments of the present disclosure have been described above, it should be understood that the embodiments disclosed herein are illustrative and non-restrictive in every respect. The scope of the present disclosure is defined by the terms of the claims and is intended to include any modifications within the scope and meaning equivalent to the terms of the claims.

REFERENCE SIGNS LIST

1 vehicular body; 2 work implement; 3 revolving unit; 4 operator's cab; 4S operator's seat; 5 traveling unit; 5Cr crawler belt; 6 boom; 7 arm; 8 bucket; 8A cutting edge; 8B bottom surface; 9 engine compartment; 10 boom cylinder; 11 arm cylinder; 12 bucket cylinder; 13 boom pin; 14 arm pin; 15 bucket pin; 16 boom cylinder stroke sensor; 17 arm cylinder stroke sensor; 18 bucket cylinder stroke sensor; 19 handrail; 20 position detection device; 21 antenna; 21A first antenna; 21B second antenna; 23 global coordinate computing unit; 25 operation device; 25L second operation lever; 25P recording button; 25R first operation lever; 26, 26# work implement controller; 30 sensor controller; 64 hydraulic device; 100 work machine; 102 detection information obtaining unit; 104 bucket position obtaining unit; 106 target execution data storage unit; 108 distance calculating unit; 110, 110# bucket position recording unit; 112 recording button input receiving unit; 200 execution management device; 1000 execution management system.

The invention claimed is:

1. A work machine comprising:

a work implement;

a work implement position sensor that obtains a position of the work implement;

an operation device provided to be able to receive an operation of operator;

a controller; and a storage that records position data indicating the position of the work implement as existing topography data when the operation of the operator is received at the operation device;

wherein the operation device includes one or more of a record button or a record switch, the controller calculates a distance between a designed topography of an execution object and a contour point that is closest to the designed topography of the construction target among a plurality of contour points of the execution object according to the position of the work implement acquired by the work implement position sensor, and the controller records position data indicating the position of the working machine of the closest contour point as the existing topography data when the operation of the operator is received at the one or more of the record button or the record switch of the operation device.

2. The work machine according to claim 1, wherein the work implement includes a cutting edge.

3. A execution management device comprising:

a work implement position sensor that obtains a position of a work implement;

an operation device provided to be able to receive an operation of operator;

a controller; and a storage that records position data indicating the position of the work implement as existing topography data when the operation of the operator is received at the operation device; wherein the operation device includes one or more of a record button or a record switch, the controller calculates a distance between a designed topography of an execution object and a contour point that is closest to the designed topography of the construction target among a plurality of contour points of the execution object according to the position of the work implement acquired by the work implement position sensor, and the controller records position data indicating the position of the working machine of the closest contour point as the existing topography data when the operation of the operator is received at the one or more of the record button or the record switch of the operation device.

4. The execution management device according to claim 3, wherein the work implement includes a cutting edge.

5. A work machine control method comprising:

obtaining a position of a work implement of a work machine from a work implement position sensor;

calculating a distance between a designed topography of an execution object and a contour point that is closest to the designed topography of the construction target among a plurality of contour points of the execution object according to the position of the work implement acquired by the work implement position sensor; and recording position data indicating the position of the working machine of the closest contour point as existing topography data when an operation of an operator is received at one or more of a record button or a record switch of an operation device, wherein a storage records the position data indicating the position of the work implement as the existing topography data when the operation of the operator is received at the one or more of the record button or the record switch of an operation device.

6. The work machine control method according to claim 5, wherein the work implement includes a cutting edge.

* * * * *